3,282,924
METHOD OF PREPARING HALOIMINIUM SALTS
Gerhard H. Alt, 730 Mosley Road, and Angelo John Speziale, 544 Fairways Circle, both of Creve Coeur, Mo.
No Drawing. Filed Aug. 22, 1963, Ser. No. 303,936
9 Claims. (Cl. 260—239)

This invention relates to a novel procedure for preparing compounds described and claimed in the inventors' copending application Serial No. 218,547, filed August 22, 1962, now abandoned. These compounds have biological activity and are useful antioxidants.

Compounds containing a ketone oxygen atom and a tertiary amino atom in the after-defined relation to each other are useful in the direct preparation of the haloiminium salts by the following general equation:

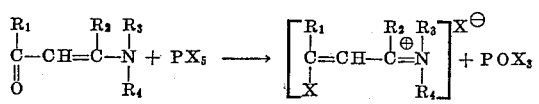

wherein $R_1$ is selected from the class consisting of alkyl of up to four carbon atoms and radicals such that $R_1$ and $R_2$ together are alkylene of one to ten carbon atoms to provide an alicyclic ring of four to eight carbon atoms; wherein $R_2$ is selected from the class consisting of alkyl of up to four carbon atoms, hydrogen, and radicals such that $R_1$ and $R_2$ together are the said alkylene radical; wherein $R_3$ and $R_4$ are selected from the class consisting of alkyl having up to four carbon atoms and radicals such that $R_3$ and $R_4$ together are a divalent radical selected from the class consisting of alkylene of two to eight carbon atoms, —R—O—R— in which R is alkylene of two to six carbon atoms, and —R—S—R— in which R is alkylene of two to six carbon atoms; and wherein X is selected from the class consisting of chlorine and bromine.

A preferred procedure involves the reaction of a phosphorus pentahalide and specific enaminoketones in the following manner:

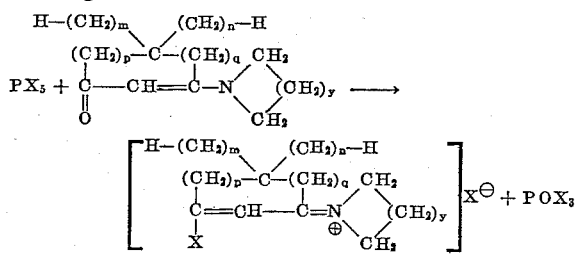

wherein $p$, $q$, $m$ and $n$ are each integers from zero to two and wherein $y$ is an integer from zero to eight.

The reactions are effected by bringing the reagents into contact while heating the mixture to a temperature of 50° C. to 150° C. The rate of reaction may be controlled by conducting the reaction in the presence of an inert water-immiscible solvent. The preferred solvents include benzene, chlorobenzene, cyclopentane, toluene, xylene, cyclohexane, n-hexane, methylchloroform, ethylene chloride, decane, cyclooctane or other inert solvent which will reflux at temperatures between 50° C. and 150° C. In this manner the temperature may be maintained within the desired limits. The reaction rate may be controlled by the dilution of the reactants with the inert solvent or by selecting a solvent with a lower reflux temperature. Similarly, the reaction may be promoted by using less of the solvent or by choosing a solvent with higher reflux temperatures.

The separation of the chloriminium salt, which usually precipitates from the solvent reaction medium, may be effected by filtering the slurry. Higher yields are usually obtained if water is added in an amount sufficient to dissolve the salt and extract the salt which may dissolve in the organic phase. The chlorides and bromide salts are often hygroscopic and the water treatment may persent problems. If the products are hygroscopic, they may be recovered and purified by conversion to a stable crystalline salt by treating with an excess of salt of suitable acid, for example sodium perchlorate or sodium borofluoride. These crystalline salts may be purified by recrystallization from a suitable solvent, such as ethanol. If the procedure is conducted to avoid the problems resulting from the hygroscopic nature of the halide salts, percaution must be taken to avoid excessive contact with water or water vapors during the preparation and in the storage of the salts.

Further particulars are set forth in the following specific examples:

Example 1

The enaminoketone of the structure

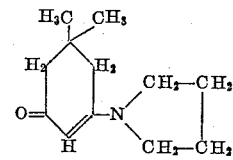

was dissolved in benzene and a stoichiometric proportion of phosphorus pentachloride was added and the mixture heated at reflux temperature for three hours and cooled. An equal volume of water was added and the resulting two-phase system was stirred for 15 minutes. The aqueous solution of the chloride salt (N-3-chloro-5,5-dimethylcyclohex-5-en-1-ylidene) - pyrrolidinium chloride was separated. Purification was accomplished by adding an excess of perchloric acid and thereby the perchlorate was precipitated. This salt was dissolved in boiling water, treated with decolorizing char, filtered and reprecipitated by cooling the solution.

Example 2

The enaminoketone of the structure

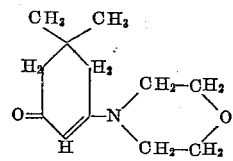

was dissolved in benzene and an equimolar proportion of phosphorus pentachloride added. The mixture was heated at reflux temperature for 3 hours. A precipitate was formed and identified as N-(3-chloro-5,5-dimethylcyclohex-2-en-1-ylidene)morpholinium chloride which was separated by adding an equal volume of water which dissolved by the product and formed a two-liquid phase system.

Example 3

Using the procedure of Example 2, phosphorus pentabromide was reacted with 3-N-piperidinylcyclohex-2-en-1-one. The product was identified as having the structure:

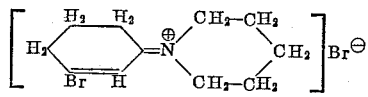

Example 4

The compound of the structure

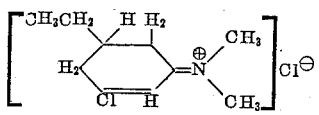

was prepared by heating at the reflux temperature a mixture of 5-ethyl-3-N-dimethylaminocyclohex-2-en-1-one and phosphorus pentachloride in toluene.

*Example 5*

Equimolar proportions of phosphorus pentachloride and 4-N-hexamethyleniminopent-3-en-2-one were reacted by the procedure of Example 1. The resulting solution of the chloride salt was precipitated with sodium borofluoride and the product identified as

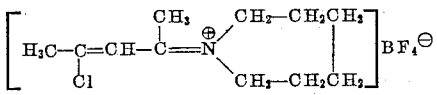

*Example 6*

Phosphorus pentabromide and an equimolar proportion of 3-N-diethylaminocyclopent-2-en-1-one were dissolved in cyclooctane and heated at reflux temperature until a substantial portion of a salt was precipitated. The product was identified as having the structure:

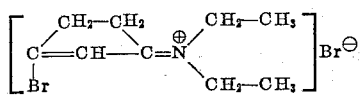

*Example 7*

Using the procedure of Example 2, phosphorus pentachloride and 3-N-pyrrolidylcyclooct-2-en-1-one were reacted to form a compound of the structure:

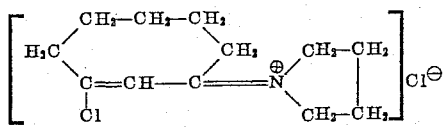

*Example 8*

Phosphorus pentachloride and 3-N-piperidinylbut-2-en-1-one in stoichiometric proportions were refluxed in xylene solution to precipitate a compound of the structure:

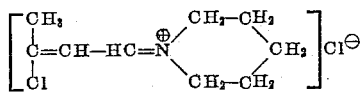

*Example 9*

3-N-morpholinyl-6-ethylcyclohept-2-en-1-one and phosphorus pentabromide were reacted at reflux in ethylene chloride solution. The resulting precipitate was identified as that having the structure:

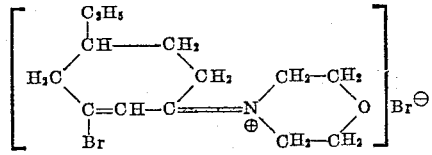

*Example 10*

Equimolar proportions of phosphorus pentachloride and 5-N-di(n-propyl)aminohept-4-en-3-one were heated at reflux in chlorobenzene and the product recovered by filtering the reaction mixture was identified as having the structure:

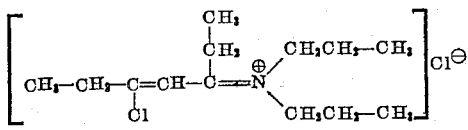

*Example 11*

Equimolar proportions of phosphorus pentabromide and 3-N-hexamethyleniminocyclohex-2-en-1-one were dissolved in benzene and heated at reflux temperature for three hours. A slurry of the product was obtained having the structure:

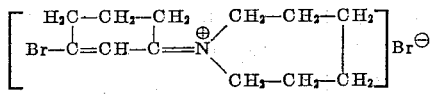

*Example 12*

Using the procedure of Example 2 phosphosus phosphorus chloride and 3-N-hexamethylenimino-5,5-dimethylcyclohex-2-en-1-one were reacted to produce a compound of the structure:

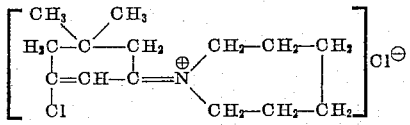

*Example 13*

Using the procedure of Example 2 except substituting 3-N-thiomorpholyl-5,5-dimethylcyclohex-2-en-1-one for the morpholine derivative, the resulting compound had the structure:

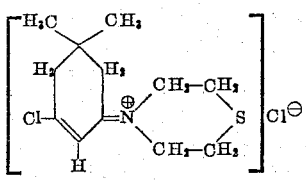

Although the invention is described by the above specific examples, it is not intended that the details thereof are limitations on the scope of the invention except to the extent incorporated in the following claims.

What is claimed is:

1. The method of preparing haloiminium salts which comprises mixing $PX_5$, wherein X is selected from the group consisting of chlorine and bromine with a compound of the structure:

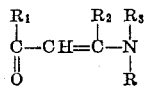

wherein $R_1$ is selected from the class consisting of alkyl having up to four carbon atoms and radicals such that $R_1$ and $R_2$ together are alkylene of one to ten carbon atoms to provide a closed ring of four to eight carbon atoms; and wherein $R_2$ is selected from the class consisting of hydrogen, alkyl having up to four carbon atoms and radicals such that $R_1$ and $R_2$ together are the said alkylene radicals; and wherein $R_3$ and $R_4$ are selected from the class consisting of alkyl having up to four carbon atoms and radicals such that $R_3$ and $R_4$ together are divalent radicals selected from the alkylene having from two to eight carbon atoms, —R—O—R— in which R is alkylene from two to six carbon atoms and —R—S—R— in which R is alkylene from two to six carbon atoms, in the presence of an inert organic solvent at a temperature between 50° C. and 180° C.

2. The method of preparing haloiminium salt which comprises mixing phosphorus pentachloride with a compound of the structure

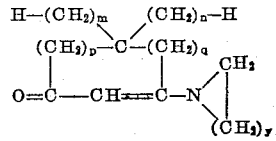

wherein m, n, p and q are integers from zero to two and y is an integer from one to eight.

3. The method of preparing a haloiminium salt which comprises heating 3-N-morpholyl-5,5-dimethylcyclohex-2-en-1-one with $PCl_5$ at the reflux temperature in an aromatic solvent boiling between 50° C. and 180° C.

4. The method of preparing a haloiminium salt which comprises heating 5-ethyl-3-N-dimethylaminocyclohex-2-en-1-one with $PCl_5$ at the reflux temperature in an aromatic solvent boiling between 50° C. and 180° C.

5. The method of preparing a haloiminium salt which comprises heating 3-N-diethylaminocyclopent-2-en-1-one with $PCl_5$ at the reflux temperature in an aromatic solvent boiling between 50° C. and 180° C.

6. The method of preparing a haloiminium salt which comprises heating 3-N-pyrrolidylcyclooct-2-en-1-one with $PCl_5$ at the reflux temperature in an aromatic solvent boiling between 50° C. and 180° C.

7. The method of preparing a haloiminium salt which comprises heating 3-N-piperidylbut-2-en-1-one with $PCl_5$ at the reflux temperature in an aromatic solvent boiling between 50° C. and 180° C.

8. The method of preparing a haloiminium salt which comprises heating 3-N-hexamethyleniminocyclohex-2-en-1-one with $PCl_5$ at the reflux temperature in an aromatic solvent boiling between 50° C. and 180° C.

9. The method of preparing a haloiminium salt which comprises heating 3-N-morpholinyl-6-ethylcyclohept-2-en-1-one with $PCl_5$ at the reflux temperature in an aromatic solvent boiling between 50° C. and 180° C.

No references cited.

ALEX MAZEL, *Primary Examiner.*

HENRY R. JILES, *Examiner.*

J. TOVAR, *Assistant Examiner.*

UNITED STATES PATENT OFFICE
CERTIFICATE OF CORRECTION

Patent No. 3,282,924                November 1, 1966

Gerhard H. Alt et al.

It is hereby certified that error appears in the above numbered patent requiring correction and that the said Letters Patent should read as corrected below.

In the heading to the printed specification, lines 3 to 5, for "Gerhard H. Alt, 730 Mosley Road, and Angelo John Speziale, 544 Fairways Circle, both of Creve Coeur, Mo." read -- Gerhard H. Alt and Angelo John Speziale, both of Creve Coeur, Mo., assignors to Monsanto Company, a corporation of Delaware --; column 4, lines 40 to 43, for the lower right-hand portion of the formula reading $\overset{|}{R}$ read $\overset{|}{R_4}$ Signed and sealed this 6th day of August 1968.

(SEAL)

Attest:

Edward M. Fletcher, Jr.                EDWARD J. BRENNER

Attesting Officer                    Commissioner of Patents